UNITED STATES PATENT OFFICE.

CARLE DAWES CLARK, OF CLIFTON, ARIZONA TERRITORY.

HYDRAULIC CEMENT AND PROCESS OF MAKING THE SAME.

No. 811,902.      Specification of Letters Patent.      Patented Feb. 6, 1906.

Application filed December 24, 1904. Serial No. 238,201.

*To all whom it may concern:*

Be it known that I, CARLE DAWES CLARK, a citizen of the United States, residing at Clifton, in the county of Graham and Territory of Arizona, have invented new and useful Improvements in Hydraulic Cement and Processes of Making the Same, of which the following is a specification.

This invention relates to the manufacture of hydraulic cement; and its object is to compound a cement having similar qualities to the well-known Portland cement, utilizing for this purpose certain waste material—to wit, the tailings from concentrating or other mills treating copper and other ores mined with an aluminous and silicious gangue.

Good Portland cement is composed of from 18.5 to twenty-five per cent. of silica, ($SiO_2$,) from 60.8 to 69.2 of the oxids of calcium, magnesium, sodium, and potassium ($CaO$, $MgO$, $Na_2O$, $K_2O$) minus calcium sulfate, which is inert, and from six to fifteen per cent. of the oxids of aluminium, iron, copper, and manganese, ($Al_2O_3$, $Fe_2O_3$, $CuO$, $MnO$.)

The analysis of selected tailings secured by simple hydraulic classification shows that they contain from fifty-six to seventy-eight per cent. of silica, from two to eight per cent. of the lime group, and from sixteen to thirty-six per cent. of the aluminous group, the ferric oxid and alumina predominating. It is therefore only necessary to add the proper percentage of limestone or lime and ferruginous materials to a selected quantity of tailings to produce an excellent Portland cement. Moreover, since the tailings can be varied in composition in the process of selecting them by washing it is clear that a cement of any desired chemical composition and rapidity of setting can be obtained.

In carrying out the process one part of the selected tailings, dried, if necessary, is mixed with from 2.5 to 4.7 parts of a calcareous substance, such as limestone, the percentages varying with the analysis of the two constituents and of the desired cement. The mass is crushed, ground, pulverized, and comminuted to a uniform mixture and of a fineness such that fifty per cent. or more will pass through a two-hundred-mesh screen. It is then burned in a suitable kiln, using coal, coke, oil, or gaseous fuel, at a high temperature until a chemical combination takes place between the $CaO$ and $Fe_2O_3$ and $Al_2O_3$ and $SiO_2$, forming a clinker. This clinker is ground and pulverized to a suitable fineness and is then ready for use as a hydraulic cement, being suitable for all the uses for which Portland cement is capable. However, owing to the purity of the silicious and aluminous constituents used in its manufacture this cement is of greater strength and whiter color than the cements now on the market with which I am familiar. This purity is due to the fact that all heavy minerals and impurities have been previously removed from the tailings in the process of concentration or other mill treatment. Inasmuch as the percentage composition of the tailings can be varied from highly silicious to highly aluminous by simple washing, a superior cement of constant composition can always be secured.

Having thus described my invention, what I claim is—

1. The process of making hydraulic cement, which consists in hydraulically classifying the tailings from concentrating or other mills treating ores with an aluminous silicious gangue, mixing them with a calcareous substance, reducing the mass to powder, burning the mixture to a clinker, and pulverizing said clinker.

2. The process of making hydraulic cement, which consists in pulverizing tailings from concentrating or other mills treating ores with an aluminous silicious gangue, hydraulically classifying said pulverized tailings, combining them with a calcareous substance by clinkering, and then grinding the clinker.

3. A hydraulic cement composed of a base clinkered with hydraulically-classified tailings from concentrating or other mills treating ores with an aluminous silicious gangue.

4. A hydraulic cement composed of limestone clinkered with hydraulically-classified tailings from concentrating or other mills treating ores with an aluminous silicious gangue.

In witness whereof I have hereunto set my hand and seal.

CARLE DAWES CLARK. [L. S.]

Witnesses:
    DAVID L. H. FORBES,
    RALPH MELLA.